(12) United States Patent
Hirano et al.

(10) Patent No.: US 11,897,230 B2
(45) Date of Patent: Feb. 13, 2024

(54) SURFACE-TREATED METAL PLATE FOR POLYOLEFIN RESIN BONDING AND COMPOSITE MEMBER USING SAME

(71) Applicant: Kobe Steel, Ltd., Kobe (JP)

(72) Inventors: Yasuo Hirano, Kakogawa (JP); Takeshi Watase, Kakogawa (JP); Tetsuya Yamamoto, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 650 days.

(21) Appl. No.: 16/081,493

(22) PCT Filed: Mar. 3, 2017

(86) PCT No.: PCT/JP2017/008458
§ 371 (c)(1),
(2) Date: Aug. 31, 2018

(87) PCT Pub. No.: WO2017/163817
PCT Pub. Date: Sep. 28, 2017

(65) Prior Publication Data
US 2020/0316912 A1    Oct. 8, 2020

(30) Foreign Application Priority Data

Mar. 25, 2016  (JP) ................................ 2016-061676

(51) Int. Cl.
| | | |
|---|---|---|
| *B32B 15/085* | (2006.01) | |
| *B32B 7/12* | (2006.01) | |
| *B32B 15/18* | (2006.01) | |
| *C09J 123/26* | (2006.01) | |
| *C08K 3/36* | (2006.01) | |
| *C09D 7/61* | (2018.01) | |
| *C09J 7/28* | (2018.01) | |
| *C23C 22/68* | (2006.01) | |
| *C23C 22/82* | (2006.01) | |
| *C09D 5/08* | (2006.01) | |
| *C08K 5/544* | (2006.01) | |

(52) U.S. Cl.
CPC ............. *B32B 15/085* (2013.01); *B32B 7/12* (2013.01); *B32B 15/18* (2013.01); *C08K 3/36* (2013.01); *C08K 5/544* (2013.01); *C09D 5/084* (2013.01); *C09D 7/61* (2018.01); *C09J 7/28* (2018.01); *C09J 123/26* (2013.01); *C23C 22/68* (2013.01); *C23C 22/82* (2013.01); *B32B 2255/06* (2013.01); *B32B 2255/26* (2013.01); *B32B 2262/101* (2013.01); *B32B 2264/1021* (2020.08); *B32B 2307/732* (2013.01)

(58) Field of Classification Search
CPC ..... B32B 15/085; B32B 7/12; B32B 2255/06; B32B 2255/26; B32B 15/18; B32B 37/15; B32B 15/08; B32B 2264/102; C08J 123/0869; C08J 123/26; C08J 133/064; C08K 3/36; C23C 2222/20; C09D 201/10; C09D 5/002; C09D 123/30; C09D 123/26; C09D 123/0869; C09D 123/0876; C09D 151/06; C09J 151/06; C09J 2451/003; C09J 2423/003; C09J 2423/043; C09J 2423/103; C09J 123/0869; C09J 123/147; C09J 123/26
See application file for complete search history.

(56) References Cited

U.S. PATENT DOCUMENTS

| | | | | |
|---|---|---|---|---|
| 2001/0053451 A1* | 12/2001 | Togawa | ............ | B29C 45/14778 428/461 |
| 2004/0022950 A1* | 2/2004 | Jung | ...................... | C09D 5/086 427/385.5 |
| 2006/0099429 A1* | 5/2006 | Domes | ..................... | C09D 4/00 427/372.2 |
| 2008/0081196 A1* | 4/2008 | Saito | ...................... | C09D 5/084 428/425.8 |
| 2010/0062200 A1 | 3/2010 | Domes et al. | | |
| 2014/0134368 A1 | 5/2014 | Domes et al. | | |
| 2015/0165661 A1* | 6/2015 | Okumura | ................. | B32B 27/32 428/164 |
| 2015/0367605 A1* | 12/2015 | Morikawa | .............. | B05D 3/007 427/388.1 |

(Continued)

FOREIGN PATENT DOCUMENTS

| | | |
|---|---|---|
| CN | 1923505 A | 3/2007 |
| CN | 101396888 A | 4/2009 |

(Continued)

OTHER PUBLICATIONS

International Search Report dated May 16, 2017 in PCT/JP2017/008458 filed Mar. 3, 2017.

*Primary Examiner* — Monique R Jackson
(74) *Attorney, Agent, or Firm* — Oblon, McClelland, Maier & Neustadt, L.L.P.

(57) ABSTRACT

The present invention relates to a surface-treated metal sheet for polyolefin resin bonding having a metal substrate and an adhesive layer laminated on at least one surface of the metal substrate with a chemical conversion coating film interposed between the metal substrate and the adhesive layer. This surface-treated metal sheet for polyolefin resin bonding is characterized in that a coating liquid for forming the chemical conversion coating film contains an acid-modified polyolefin resin, a colloidal silica, and a silane coupling agent; a coating amount of the chemical conversion coating film is 0.05 to 3 g/m² in terms of dry mass; the adhesive layer contains an acid-modified polyolefin resin; and the adhesive layer has a thickness of 5 to 100 μm.

19 Claims, No Drawings

(56) References Cited

U.S. PATENT DOCUMENTS

| | | | |
|---|---|---|---|
| 2016/0243794 A1 | 8/2016 | Hirano et al. | |
| 2017/0088753 A1* | 3/2017 | Nakamura | ................ B32B 1/00 |
| 2018/0305592 A1* | 10/2018 | Yokomichi | ............. B32B 27/00 |
| 2019/0023954 A1* | 1/2019 | Kouka | .................... B32B 27/32 |

FOREIGN PATENT DOCUMENTS

| | | | | |
|---|---|---|---|---|
| EP | 3 418 427 A1 | | 12/2018 | |
| JP | 2002-212749 A | | 7/2002 | |
| JP | 2008-195832 A | | 8/2008 | |
| JP | 2008-266446 A | | 11/2008 | |
| JP | 2015-80884 A | | 4/2015 | |
| JP | 2015-196878 A | | 11/2015 | |
| WO | WO-2015064689 A1 | * | 5/2015 | ........... B32B 15/085 |

* cited by examiner

SURFACE-TREATED METAL PLATE FOR POLYOLEFIN RESIN BONDING AND COMPOSITE MEMBER USING SAME

TECHNICAL FIELD

The present invention relates to a surface-treated metal sheet for polyolefin resin bonding that is excellent in adhesiveness, and to a composite member including the same.

BACKGROUND ART

Many metal components including steel sheets (metal sheets) are used in automobiles, domestic appliances, office automation equipment, and the like. In many cases, such metal components are used by being obtained through press-molding of a metal sheet to provide a predetermined shape and thereafter being joined with another metal component or plastic component by means of welding, screwing, or the like.

Meanwhile, if a surface of a metal sheet can be provided with adhesiveness to a plastic, it is possible to form a metal sheet composite resin molded article (hereafter referred to as composite member), in which a metal component and a resin molded article such as a plastic component are bonded to each other, simply by press-molding the metal sheet, thereafter setting the press-molded metal sheet in a plastic molding die, injecting a molten plastic, and solidifying the plastic by cooling. This leads to increased efficiency of the member production step and weight reduction of the member. As a method for providing a surface of a metal sheet with adhesiveness to a plastic, the present applicant proposes in Patent Literature 1 a surface-treated steel sheet in which a metal substrate, a chemical conversion coating film, and an adhesive layer are laminated in that order, in which the chemical conversion coating film contains a colloidal silica and a thermosetting resin.

In recent years, further weight reduction is achieved by using as the plastic a polyolefin resin having high strength with light weight, and a resin molded article containing a polypropylene resin is used in Patent Literature 1 as well. However, in the composite member of Patent Literature 1 in which a surface-treated steel sheet and a resin molded article containing a polypropylene resin are bonded with each other, there are cases in which peeling-off between the chemical conversion coating film and the adhesive layer is liable to occur because the resin contained in the chemical conversion coating film is a thermosetting resin, though the adhesive strength between the metal substrate and the resin molded article (which may hereafter be simply referred to as adhesive strength) is high to some extent. In other words, when the composite member is used for purposes that demand a high adhesiveness such as a structural component of an automobile, the composite member may not have a sufficient adhesiveness.

Also, Patent Literature 1 proposes a surface-treated steel sheet in which a primer layer is provided between a chemical conversion coating film and an adhesive layer for enhancing the adhesive strength; however, there is a need to prepare the surface-treated steel sheet by laminating three layers on a metal substrate, thereby increasing the number of production steps and raising the production costs. Also, from the viewpoint of reducing the weight of the members that is demanded in recent years, it is desired to reduce the number of laminations.

CITATION LIST

Patent Literature

Patent Literature 1: Japanese Unexamined Patent Publication No. 2015-110318

SUMMARY OF INVENTION

In view of the circumstances mentioned above, the present invention aims to provide, at a low cost, a surface-treated metal sheet for polyolefin resin bonding that excellent in adhesiveness.

One aspect of the present invention is a surface-treated metal sheet for polyolefin resin bonding having a metal substrate and an adhesive layer laminated on at least one surface of the metal substrate with a chemical conversion coating film interposed between the metal substrate and the adhesive layer, in which a coating liquid for forming the chemical conversion coating film contains an acid-modified polyolefin resin, a colloidal silica, and a silane coupling agent, a coating amount of the chemical conversion coating film is 0.05 to 3 $g/m^2$ in terms of dry mass, the adhesive layer contains an acid-modified polyolefin resin, and the adhesive layer has a thickness of 5 to 100 μm.

DESCRIPTION OF EMBODIMENTS

A surface-treated metal sheet of the present invention has a metal substrate and an adhesive layer laminated on at least one surface of the metal substrate with a chemical conversion coating film interposed between the metal substrate and the adhesive layer. A coating liquid for forming the chemical conversion coating film contains an acid-modified polyolefin resin, a colloidal silica, and a silane coupling agent, a coating amount of the chemical conversion coating film is 0.05 to 3 $g/m^2$ in terms of dry mass, the adhesive layer contains an acid-modified polyolefin resin, and the adhesive layer has a thickness of 5 to 100 μm.

The present invention makes it possible to produce at a low cost a surface-treated metal sheet excellent in adhesiveness by including a chemical conversion coating film containing an acid-modified polyolefin resin and an adhesive layer containing an acid-modified polyolefin resin. The surface-treated metal sheet of the present invention can be used in a case or interior/exterior component for an automobile or domestic appliance, an outer plate member for furniture made of steel, an architectural material, or the like.

Also, the present invention can provide a composite member in which the aforementioned surface-treated metal sheet and a resin are integrally composited. Therefore, the composite member of the present invention is useful in a variety of applications such as automotive components, domestic appliances, architectural materials, and office automation equipment.

Furthermore, in the surface-treated metal sheet of the present invention, it is preferable that the adhesive layer is laminated on at least one surface of the metal substrate with only the chemical conversion coating film interposed between the metal substrate and the adhesive layer.

Hereafter, embodiments of the present invention will be described.

Metal Substrate (Steel Sheet)

The metal substrate to be used in the present invention is not particularly limited, and examples thereof include steel sheets such as a non-plated cold-rolled steel sheet, a hot-dip galvanized steel sheet, a hot-dip galvannealed steel sheet, and an electrogalvanized steel sheet as well as an aluminum sheet and a titanium sheet. Among these, a hot-dip galvanized steel sheet, an electrogalvanized steel sheet, an aluminum sheet, and a titanium sheet are preferable, and a hot-dip galvannealed steel sheet is more preferable. The thickness of the metal substrate is not particularly limited; however, the thickness is preferably about 0.3 to 3.2 mm in view of weight reduction in final products. Hereafter, description will be given on an embodiment in which a steel sheet that is a preferable example of the metal substrate is used; however, various types of metal substrates can be used in the present invention.

Chemical Conversion Coating Film

The chemical conversion coating film can be prepared by using a chemical conversion coating film-forming coating liquid containing an acid-modified polyolefin resin, a colloidal silica, and a silane coupling agent.

Acid-Modified Polyolefin Resin

The chemical conversion coating film-forming coating liquid used in the present embodiment contains an acid-modified polyolefin resin, that is, the chemical conversion coating film contains the acid-modified polyolefin resin. The chemical conversion coating film contains the acid-modified polyolefin resin, so that the peeling-off between the chemical conversion coating film and the adhesive layer can be suppressed. The acid-modified polyolefin resin preferably contains an acid-modified polypropylene resin.

The acid-modified polyolefin resin used in the present embodiment can be obtained by graft polymerization of at least one selected from the group consisting of an unsaturated dicarboxylic acid and an anhydride and ester derivative thereof to a polyolefin resin.

Examples of the polyolefin resin serving as a raw material of the acid-modified polyolefin resin include resins such as polyethylene, polypropylene, polybutene, polymethylpentene, copolymer of α-olefin and ethylene or propylene, ethylene-vinyl acetate copolymer, ethylene-acrylic acid copolymer, ethylene-methacrylic acid copolymer, ethylene-maleic anhydride copolymer, and propylene-maleic anhydride copolymer, and these may be used either alone or in combination of two or more kinds. From the viewpoint of suppressing the peeling-off between the chemical conversion coating film and the adhesive layer, the polyolefin resin preferably includes a polypropylene resin, and more preferably is a polypropylene resin.

The polypropylene resin may be a homopolypropylene (homopolymer of propylene) or may be a copolymer of propylene with one or more kinds selected from the group consisting of ethylene, other α-olefins, and vinyl compounds. The other α-olefin is preferably an α-olefin having a carbon number of 4 to 18, and examples thereof include 1-butene, isobutene, 1-pentene, 4methyl-1-pentene, 1-hexene, 1-octene, 1-decene, and 1-dodecene. The polypropylene resin is preferably a homopolypropylene in view of the adhesion between the chemical conversion coating film and the adhesive layer.

Examples of the unsaturated dicarboxylic acid include maleic acid, fumaric acid, citraconic acid, mesaconic acid, and itaconic acid. Examples of the anhydride of the unsaturated dicarboxylic acid include maleic anhydride, itaconic anhydride, and citraconic anhydride. Examples of the ester derivative of the unsaturated dicarboxylic acid include monomethyl maleate. Among these, the anhydride of the unsaturated dicarboxylic acid is preferable, and maleic anhydride is more preferable. The unsaturated dicarboxylic acid and the anhydride or ester derivative thereof may be used either alone or in combination of two or more kinds.

The acid-modified polyolefin resin is produced by graft-polymerizing the unsaturated dicarboxylic acid or the anhydride or ester derivative thereof to the polyolefin resin described above in accordance with a conventional method.

For example, a maleic anhydride-modified polyolefin resin can be synthesized in the following manner. As a solvent, xylene, 2,2,4-trimethyl-1,3-pentanediol diisobutylate, or the like is used. A polypropylene resin, maleic anhydride, and an organic peroxide (for example, t-butylperoxy-2-ethylhexyl carbonate) are charged suitably in an arbitrary order or together. Typically, under heating, for example, at about 130 to 150° C., maleic anhydride is graft-polymerized to the polyolefin resin, thereby to obtain a maleic anhydride-modified polyolefin resin.

The acid-modified polyolefin resin in the chemical conversion coating film preferably has an acid value of 3 to 100 mgKOH/g, more preferably 5 to 80 mgKOH/g, and still more preferably 5 to 60 mgKOH/g. When the acid value is less than 3 mgKOH/g, it is difficult to produce an aqueous chemical conversion coating film-forming coating liquid. On the other hand, it is difficult to prepare an acid-modified polyolefin resin having an acid value exceeding 100 mgKOH/g.

The graft amount of maleic anhydride in the acid-modified polyolefin resin is preferably 0.1 to 10 mass %, more preferably 0.3 to 7 mass %, and still more preferably 0.5 to 5 mass %. When the graft amount is less than 0.1 mass %, the adhesive strength may become insufficient. On the other hand, when the graft amount exceeds 10 mass %, compatibility with unmodified polyolefin resin may become degraded. When two or more kinds of an unsaturated dicarboxylic acid and an anhydride and ester derivative thereof are used, a sum of the contents of these is regarded as the graft amount.

As the acid-modified polyolefin resin, a commercially available product may be used. Examples of the commercially available products include "UNISTOLE (registered trademark)" series, "NOVATEC (registered trademark)" series and "WINTEC (registered trademark)" series manufactured by Japan Polypropylene Corporation, and "Prime Polypro (registered trademark)" series manufactured by Prime Polymer Co., Ltd.

It is preferable that the aforementioned chemical conversion coating film does not contain a thermoplastic resin other than the acid-modified polyolefin resin; however, the chemical conversion coating film may contain a thermoplastic resin other than the acid-modified polyolefin resin to such an extent that the effects of the present invention are not deteriorated. Examples of the other thermoplastic resin include polystyrene resin, acrylonitrile-butadiene-styrene (ABS) copolymer, acrylonitrile-EPDM-styrene (AES) copolymer, acrylic resin, polybutadiene, polyacetal resin, polyether resin, polyvinyl acetate, polyvinyl chloride, and polyvinylidene chloride. These may be used either alone or in combination of two or more kinds.

With regard to 100 mass % of the total resin contained in the chemical conversion coating film, the content of the acid-modified polyolefin resin is preferably 80 mass % or more, more preferably 90 mass % or more, still more preferably 99.91 mass % or more, particularly preferably 99.95 mass % or more, and most preferably 100 mass %

(which means that the resin contained in the chemical conversion coating film is the acid-modified polyolefin resin only).

With regard to 100 parts by mass of the solid contents of the chemical conversion coating film-forming coating liquid, the amount of the thermoplastic resin is preferably 30 to 60 parts by mass, more preferably 35 to 55 parts by mass, and still more preferably 40 to 50 parts by mass. Also, the amount of the thermoplastic resin contained in the chemical conversion coating film is preferably 30 to 60 mass %, more preferably 35 to 55 mass %, and still more preferably 40 to 50 mass %.

Colloidal Silica

The chemical conversion coating film-forming coating liquid preferably contains a colloidal silica. In other words, the chemical conversion coating film of the present embodiment preferably contains a colloidal silica. This is because inclusion of colloidal silica provides an effect of enhancing the corrosion resistance. As the colloidal silica, "XS", "SS", "40", "N", "UP", and others of "SNOWTEX (registered trademark)" series (colloidal silica manufactured by Nissan Chemical Industries, Ltd.) are suitably used. In particular, "SNOWTEX (registered trademark) 40" having a surface area average particle size of about 10 to 20 nm is suitably used. The amount of the colloidal silica is preferably 30 to 60 parts by mass, more preferably 35 to 55 parts by mass, and still more preferably 40 to 50 parts by mass in 100 parts by mass of the solid contents of the chemical conversion coating film-forming coating liquid. Further, the amount of the colloidal silica contained in the chemical conversion coating film is preferably 50 to 150 parts by mass, more preferably 75 to 125 parts by mass, relative to 100 parts by mass of the thermoplastic resin contained in the chemical conversion coating film.

Silane Coupling Agent

The chemical conversion coating film-forming coating liquid preferably contains a silane coupling agent. Inclusion of a silane coupling agent can improve the adhesion of the chemical conversion coating film to the metal substrate. Specific examples of the silane coupling agent include amino group-containing silane coupling agents such as γ-aminopropyltrimethoxysilane, γ-aminopropyltriethoxysilane, N-(β-aminoethyl)-γ-aminopropyltrimethoxysilane, and N-(β-aminoethyl)-γ-aminopropylmethyldimethoxysilane; glycidoxy group-containing silane coupling agents such as γ-glycidoxypropyltrimethoxysilane, γ-glycidoxypropylmethyldimethoxysilane, γ-glycidoxypropyltriethoxysilane, and γ-glycidoxymethyldimethoxysilane; vinyl group-containing silane coupling agents such as vinyltrimethoxysilane, vinyltriethoxysilane, and vinyltris(β-methoxyethoxy)silane; methacryloxy group-containing silane coupling agents such as γ-methacryloxypropyltrimethoxysilane; mercapto group-containing silane coupling agents such as γ-mercaptopropyltrimethoxysilane and γ-mercaptopropylmethyldimethoxysilane; and halogen group-containing silane coupling agents such as γ-chloropropylmethoxysilane and γ-chloropropyltrimethoxysilane. Among these, the silane coupling agent is preferably an amino group-containing silane coupling agent. These silane coupling agents may be used either alone or in combination of two or more kinds. Among these, an amino group-containing silane coupling agent and a glycidoxy group-containing silane coupling agent are preferable, and an amino group-containing silane coupling agent is more preferable, from the viewpoint of providing good adhesiveness. The amount of the silane coupling agent is preferably 1 to 30 parts by mass, more preferably 3 to 20 parts by mass, and still more preferably 5 to 15 parts by mass, relative to 100 parts by mass of the solid contents of the chemical conversion coating film-forming coating liquid.

As the silane coupling agent, a commercially available product can be used as well. Examples of suitably usable silane coupling agents include KBM903 (3-aminopropyltrimethoxysilane) manufactured by Shin-Etsu Silicone Co., Ltd., Z-6011 (3-aminopropyltriethoxysilane) manufactured by Dow Corning Toray Co., Ltd., and Z-6020 (3-(2-aminoethyl)aminopropyltrimethoxysilane) manufactured by Dow Corning Toray Co., Ltd.

Coating Amount of Chemical Conversion Coating Film

The coating amount of the chemical conversion coating film is 0.05 to 3 $g/m^2$, preferably 0.1 to 2.5 $g/m^2$, and more preferably 0.2 to 2 $g/m^2$, in terms of dry mass. When the coating amount of the chemical conversion coating film is out of this range, the adhesive strength to the resin molded article may decrease.

Method of Forming Chemical Conversion Coating Film

A chemical conversion coating film is formed by applying a chemical conversion coating film-forming coating liquid containing an acid-modified polyolefin resin, a colloidal silica, and a silane coupling agent onto at least one surface of a metal substrate. At the time of forming the chemical conversion coating film, publicly known other additives may be added into the coating liquid. A method of forming the chemical conversion coating film on the metal substrate is not particularly limited, and publicly known conventional application methods can be adopted. For example, the chemical conversion coating film-forming coating liquid may be applied onto one surface or both surfaces of the metal substrate with use of a roll coater method, a spray method, a curtain flow coater method, or the like, followed by heating and drying. The heating and drying temperature is not particularly limited; however, since the coating liquid for forming the chemical conversion coating film is an aqueous liquid, it is desirable to carry out heating for several ten seconds to several minutes at a temperature of around 100° C. at which water evaporates.

Surface-Treated Steel Sheet

An adhesive layer composed of an adhesive containing an acid-modified polyolefin resin is provided on the aforementioned chemical conversion coating film to form a surface-treated steel sheet. The adhesive layer may be provided over the whole surface of the chemical conversion coating film or may be provided at necessary parts on the surface of the chemical conversion coating film. The adhesive layer may be provided, for example, in a shape of several lines or in a dotted shape. The adhesive layer is preferably an adhesive layer having excellent adhesiveness to the surface-treated steel sheet and a later-mentioned resin molded article.

Adhesive

The adhesive contains an acid-modified polyolefin resin, preferably contains an acid-modified polypropylene resin, and is more preferably composed of an acid-modified polypropylene resin.

The acid-modified polyolefin resin in the adhesive layer preferably has an acid value of 5 to 60 mgKOH/g, more preferably 10 to 50 mgKOH/g, and still more preferably 13 to 40 mgKOH/g. When the acid value of the acid-modified polyolefin resin is out of this range, the adhesive strength may decrease.

The acid-modified polyolefin resin can be produced by a method similar to the method of producing the acid-modified polyolefin resin contained in the chemical conversion coating film. The acid value of the acid-modified polyolefin resin contained in the adhesive layer may be the same as or different from that of the acid-modified polyolefin resin contained in the chemical conversion coating film; however, the two acid-modified polyolefin resins preferably have the same acid values.

It is preferable that the aforementioned adhesive layer does not contain a thermoplastic resin other than the acid-modified polyolefin resin; however, the adhesive layer may contain a thermoplastic resin other than the acid-modified polyolefin resin to such an extent that the effects of the present invention are not deteriorated. Examples of the other thermoplastic resin include polystyrene resin, acrylonitrile-butadiene-styrene (ABS) copolymer, acrylonitrile-EPDM-styrene (AES) copolymer, acrylic resin, polybutadiene, polyacetal resin, polyether resin, polyvinyl acetate, polyvinyl chloride, and polyvinylidene chloride. These may be used either alone or in combination of two or more kinds.

With regard to 100 mass % of the total resin contained in the adhesive layer, the content of the acid-modified polyolefin resin is preferably 80 mass % or more, more preferably 90 mass % or more, still more preferably 99.91 mass % or more, particularly preferably 99.95 mass % or more, and most preferably 100 mass % (which means that the resin contained in the adhesive layer is the acid-modified polyolefin resin only).

The adhesive layer has a thickness of 5 to 100 μm, preferably 10 to 90 μm, after drying. When the thickness of the adhesive layer is out of this range, the adhesive strength may decrease.

Method of Laminating Adhesive Layer

In the present embodiment, the adhesive layer is laminated on the chemical conversion coating film by applying a hot-melt adhesive containing an acid-modified polyolefin resin onto the chemical conversion coating film. The hot-melt adhesive can be applied by a publicly known method and, for example, can be applied in a powder state onto the surface of a chemical conversion steel sheet. Also, a solution obtained by dissolving an adhesive in an organic solvent or a water dispersion obtained by dispersing an adhesive in water may be applied onto a chemical conversion steel sheet. After application of the adhesive, the resultant is heated for about 1 to 3 minutes at a temperature suitable for the type of the adhesive (for example, about 180 to 230° C.).

Composite Member

The surface-treated steel sheet of the present embodiment is used by being composited with a resin molded article (resin layer). In other words, the surface-treated steel sheet can be used as a composite member in which a resin layer is provided on the adhesive layer. In the case where processing is needed, the adhesive layer may be provided after the chemical conversion steel sheet is press-molded into an intended shape, or alternatively, a surface-treated steel sheet having an adhesive layer provided on the chemical conversion steel sheet may be press-molded into an intended shape. Then, the composite member is obtained by placing the surface-treated steel sheet into a mold of an injection molding machine, subjecting the surface-treated steel sheet to mold clamping, injecting a molten resin into the mold, and causing the resin to be cooled and solidified. Naturally, the surface-treated steel sheet of the present embodiment may be composited with a resin layer by a press-molding method; however, it is preferable to adopt the injection molding method in order to make use of the advantages of short time and high efficiency of injection molding.

The conditions for the injection molding may be suitably changed in accordance with the type of the resin constituting the molded article. One example of the conditions for the case where the resin molded article is a polypropylene resin may be such that the cylinder temperature is set to 230 to 250° C.; the mold temperature is set to 45 to 55° C.; the injection holding time is set to 5 to 8 seconds; and the cooling time is set to about 20 to 30 seconds. When the injection molding is carried out under the conditions, the composite member of the present embodiment is obtained in which the resin layer and the surface-treated steel sheet are firmly bonded to each other.

Resin Layer

The resin layer contains a polyolefin resin. Examples of the polyolefin resin include resins such as polyethylene, polypropylene, polybutene, polymethylpentene, copolymer of α-olefin and ethylene or propylene, ethylene-vinyl acetate copolymer, ethylene-acrylic acid copolymer, ethylene-methacrylic acid copolymer, ethylene-maleic anhydride copolymer, and propylene-maleic anhydride copolymer, and these may be used either alone or in combination of two or more kinds. The polyolefin resin preferably includes a polypropylene resin, and more preferably includes a polypropylene resin alone.

In order to enhance the strength of the composite member, the resin layer may contain reinforcing fibers such as glass fibers or carbon fibers in an amount of about 5 to 60 mass %. Further, publicly known additives such as various kinds of pigments and dyes, flame retardants, antimicrobial agents, antioxidants, plasticizers, and lubricants may be added.

Physical Properties of Composite Member (Adhesiveness)

The composite member has an adhesive strength of preferably 12 MPa or more, more preferably 12.5 MPa or more, still more preferably 13 MPa or more, and particularly preferably 14 MPa or more. By using the surface-treated steel sheet of the present embodiment, the adhesive strength of the composite member can be sufficiently enhanced even when the surface-treated steel sheet includes a metal substrate provided with only two layers of the chemical conversion coating film and the adhesive layer. A method of measuring the adhesive strength will be described later.

While the present specification discloses various modes of techniques as described above, principal techniques among these will be summarized as follows.

The present invention is directed to a surface-treated metal sheet for polyolefin resin bonding having a metal substrate and an adhesive layer laminated on at least one surface of the metal substrate with a chemical conversion coating film interposed between the metal substrate and the adhesive layer, in which a coating liquid for forming the chemical conversion coating film contains an acid-modified polyolefin resin, a colloidal silica, and a silane coupling agent, a coating amount of the chemical conversion coating film is 0.05 to 3 g/m² in terms of dry mass, the adhesive layer contains an acid-modified polyolefin resin, and the adhesive layer has a thickness of 5 to 100 μm.

In the surface-treated metal sheet for polyolefin resin bonding, the acid-modified polyolefin resin in the chemical conversion coating film preferably has an acid value of 3 to 100 mgKOH/g, and the acid-modified polyolefin resin in the chemical conversion coating film preferably includes an acid-modified polypropylene resin.

Further, in the surface-treated metal sheet for polyolefin resin bonding, the acid-modified polyolefin resin in the adhesive layer preferably has an acid value of 5 to 60 mgKOH/g, and the acid-modified polyolefin resin in the adhesive layer preferably includes an acid-modified polypropylene resin.

The metal substrate is preferably a steel sheet.

Furthermore, the present invention encompasses a composite member having the surface-treated metal sheet and a resin layer containing a polyolefin resin provided on the adhesive layer in the surface-treated metal sheet, in which the polyolefin resin preferably includes a polypropylene resin.

In addition, the present invention encompasses a method for producing the aforementioned surface-treated metal sheet for polyolefin resin bonding, the method including the steps of: forming a chemical conversion coating film by applying onto at least one surface of a metal substrate a chemical conversion coating film-forming coating liquid containing an acid-modified polyolefin resin, a colloidal silica, and a silane coupling agent; and laminating an adhesive layer onto the chemical conversion coating film by applying a hot-melt adhesive containing an acid-modified polyolefin resin onto the chemical conversion coating film.

EXAMPLES

Hereafter, the present invention will be described in further detail by way of examples. However, the following examples do not limit the present invention, and any change that does not deviate from the gist of the present invention is encompassed by the present invention. Unless specifically mentioned, "parts" denotes "parts by mass", and "%" denotes "mass %".

First, measurement and evaluation methods used in the examples will be described below.

Adhesiveness (Adhesive Strength)

In a composite member obtained by a production method described later, the end of the surface-treated steel sheet as viewed in the longitudinal direction and the end of the resin layer as viewed in the longitudinal direction were held with a chuck of a tensile tester in an atmosphere of 25° C. and pulled at a tensile speed of 10 mm/min. The tensile strength at which the resin layer was peeled off from the surface-treated steel sheet was measured, and the obtained value was determined as the adhesive strength. It is to be noted that the end of the surface-treated steel sheet as viewed in the longitudinal direction is an end on the side that is not covered with the resin layer, and the end of the resin layer as viewed in the longitudinal direction is an end on the side to which the surface-treated steel sheet is not bonded.

Example 1

Preparation of Maleic Anhydride Grafted Polypropylene Resin

Into a flask equipped with a cooling tube, 400 ml of xylene serving as a solvent and 60 g of granular homopolypropylene (melt flow rate: 4 g/10 min) were put, and the mixture was heated to 140° C. and stirred under a nitrogen stream. Thereafter, into the stirred solution, 40 ml of xylene in which 11 g of maleic anhydride and 4 g of t-butylperoxy 2-ethylhexyl carbonate had been dissolved was dropwise added over one hour, and then reaction was carried out for one hour. Subsequently, the contents were cooled to room temperature and put into a large amount of methyl ethyl ketone. Finally, filtration was carried out to obtain a maleic anhydride grafted polypropylene resin. The graft amount of maleic anhydride in the obtained maleic anhydride grafted polypropylene resin was 3.0 mass %, and the acid value of the obtained maleic anhydride grafted polypropylene resin was 25 mgKOH/g.

Chemical Conversion Coating Film-Forming Coating Liquid

A pressure-resistant container made of stainless steel was charged with 10 g of the aforementioned maleic anhydride grafted polypropylene resin, 1 g of triethylamine, 10 g of butanol, and 30 g of distilled water, and the mixture was stirred at 100 rpm at 170° C. for one hour. Thereafter, the resultant was cooled to obtain a water dispersion of maleic anhydride grafted polypropylene resin. Next, into a 100 ml-autoclave, the water dispersion of maleic anhydride grafted polypropylene resin prepared by the above preparation method, a colloidal silica, and a silane coupling agent were added so that the mass ratios (solid contents) of maleic anhydride grafted polypropylene resin : colloidal silica : silane coupling agent=50:50:10. The mixture was stirred for two hours at a temperature of 140° C. and a stirring speed of 500 rpm, thereby to obtain a chemical conversion coating film-forming coating liquid. As the colloidal silica, SNOWTEX (registered trademark) 40 (having a surface area average particle size of about 10 to 20 nm) manufactured by Nissan Chemical Industries, Ltd. was used. As the silane coupling agent, KBM903 (γ-aminopropyltrimethoxysilane) manufactured by Shin-Etsu Chemical Co., Ltd. was used.

Chemical Conversion Steel Sheet

The chemical conversion coating film-forming coating liquid was applied onto a surface of a hot-dip galvannealed steel sheet having a thickness of 1.0 mm so that the coating amount was 0.2 g/m² in terms of dry mass, followed by heating at 100° C. for one minute to obtain a chemical conversion steel sheet provided with the chemical conversion coating film.

Surface-Treated Steel Sheet

The above maleic anhydride grafted polypropylene resin having an acid value of 25 mgKOH/g was applied onto the chemical conversion coating film of the chemical conversion steel sheet with use of a bar coater so that the thickness was 20 μm, followed by heating at 220° C. for two minutes to obtain a surface-treated steel sheet provided with the chemical conversion coating film and the adhesive layer.

Composite Member

Next, injection molding was carried out with use of an injection molding machine (PNX60 manufactured by Nissei Plastic Industrial Co., Ltd.). First, the above surface-treated steel sheet was cut to a size of 100 mm×25 mm and put into a mold. Thereafter, Prime Polypro (registered trademark) V7000 manufactured by Prime Polymer Co., Ltd., which contains 20 mass % of glass fibers and is a polypropylene resin, was melted, so that a composite member having a size of 100 mm length×25 mm width×3 mm thickness and provided with a resin layer was obtained. It is to be noted that the composite member was obtained as follows: the surface-treated steel sheet was bonded with the resin layer such that the surface of the surface-treated steel sheet was not completely covered with the resin layer, but the surface of the surface-treated steel sheet and the resin layer overlapped with each other at 12.5 mm length×25 mm width (so as to cover only a part of the surface of the surface-treated steel sheet with the resin layer). The injection conditions are shown in Table 2. Further, the adhesive strength of the composite member was measured by the measurement method described above, and the results thereof are shown in Table 1.

Examples 2 and 3 and Comparative Examples 1 and 2

Composite members were obtained in the same manner as in Example 1 except that the coating amounts of the chemical conversion coating films were set to amounts shown in Table 1. The adhesive strength of each of the composite members is shown in Table 1.

Examples 4 and 5 and Comparative Examples 3 and 4

Composite members were obtained in the same manner as in Example 1 except that the adhesive layers were made to have thicknesses shown in Table 1. The adhesive strength of each of the composite members is shown in Table 1.

Examples 6 to 10 and Comparative Examples 5 and 6

Composite members were obtained in the same manner as in Example 1 except that the maleic anhydride grafted polypropylene resins of the chemical conversion coating films were made to have acid values shown in Table 1. The adhesive strength of each of the composite members is shown in Table 1. In the preparation of each of the aforementioned maleic anhydride grafted polypropylene resins, the acid value of the resin was adjusted by adjusting the charging ratio of homopolypropylene and maleic anhydride.

Examples 11 and 12 and Comparative Examples 7 and 8

Composite members were obtained in the same manner as in Example 1 except that the maleic anhydride grafted polypropylene resins of the adhesive layers were made to have acid values shown in Table 1. The adhesive strength of each of the composite members is shown in Table 1. In the preparation of each of the aforementioned maleic anhydride graft polypropylene resins, the acid value of the resin was adjusted by adjusting the charging ratio of homopolypropylene and maleic anhydride.

Comparative Examples 9 and 10

Composite members were obtained in the same manner as in Example 1 except that, instead of the maleic anhydride grafted polypropylene resin, resins shown in Table 1 were used as the resin of the chemical conversion coating film. The adhesive strength of each of the composite members is shown in Table 1.

TABLE 1

| | Chemical conversion coating film | | | Adhesive layer | | |
|---|---|---|---|---|---|---|
| | Coating | Resin | | Resin | | Adhesive |
| | amount (g/m$^2$) | Acid value (mgKOH/g) | Type | Acid value (mgKOH/g) | Thickness (μm) | strength (MPa) |
| Example 1 | 0.2 | 25 | Acid-modified polypropylene | 25 | 20 | 16.2 |
| Example 2 | 1.8 | | | | | 15.9 |
| Example 3 | 3 | | | | | 12.6 |
| Comparative Example 1 | 0.02 | | | | | 11.4 |
| Comparative Example 2 | 0.005 | | | | | 6.8 |
| Example 4 | 0.2 | | | | 6 | 12.1 |
| Example 5 | | | | | 90 | 16.8 |
| Comparative Example 3 | | | | | 3 | 3.2 |
| Comparative Example 4 | | | | | 150 | 11.5 |
| Example 6 | 0.2 | 5 | | | 20 | 14.6 |
| Example 7 | | 9 | | | | 15.4 |
| Example 8 | | 25 | | | | 16.2 |
| Example 9 | | 48 | | | | 15.8 |
| Example 10 | | 76 | | | | 13.7 |
| Comparative Example 5 | | 0 | | | | — |
| Comparative Example 6 | | 103 | | | | — |

TABLE 1-continued

| | Chemical conversion coating film | | | Adhesive layer | | |
|---|---|---|---|---|---|---|
| | Coating amount ($g/m^2$) | Resin Acid value (mgKOH/g) | Type | Resin Acid value (mgKOH/g) | Thickness (μm) | Adhesive strength (MPa) |
| Example 11 | 0.2 | 25 | | 13 | | 16.6 |
| Example 12 | | | | 49 | | 13.3 |
| Comparative Example 7 | | | | 0 | | 7.8 |
| Comparative Example 8 | | | | 72 | | 9.5 |
| Comparative Example 9 | 0.2 | — | Polyurethane (SUPERFLEX (registered trademark) 170): 45 parts + carbodiimide compound (CARBODILITE (registered trademark) SV-02): 5 parts | 25 | | 11.5 |
| Comparative Example 10 | | | Polyacrylate (JURYMER (registered trademark) ET-410 manufactured by Toagosei Co., Ltd.) | | | 7.2 |

TABLE 2

| Molding machine | | Injection molding machine PNX60 manufactured by Nissei Plastic Industrial Co., Ltd. |
|---|---|---|
| Shape of molded article | | 100 × 25 × 3.0 mm (Insertion side: 0.8 mmt) |
| Cylinder temperature (° C.) | Nozzle | 240 |
| | Front part | 250 |
| | Central part | 250 |
| | Rear part | 240 |
| | Rearmost part | 230 |
| Mold temperature (° C.) | | 45 to 55 |
| Injection pressure | Limit pressure (MPa) | 40 |
| | Holding pressure (MPa) | 50 |
| Filling speed (mm/s) | | 10 |
| Rotation speed of screw (rpm) | | 80 |
| Back pressure (MPa) | | 5 |
| Settings | Injection pressure - holding time (s) | 6.5 |
| | Cooling time (s) | 25 |
| | Intermediate time (s) | 0.3 |
| | Metering finishing position (mm) | 30 |
| | V-P switching position (mm) | 7.5 |
| Actual measurement | Metering (s) | 7.38 |
| | Packing (s) | 2.47 |
| | 1 cycle (s) | — |

From Table 1, studies can be made as follows.

Composite members of Examples 1 to 12 that satisfy the constitutional requirements of the present invention and that are provided with the surface-treated steel sheets were excellent in adhesive strength.

In contrast, the surface-treated steel sheets other than those described above did not satisfy the constitutional requirements of the present invention, and hence desired characteristics could not be obtained, as will be described in detail in the following.

In Comparative Examples 1 and 2, the coating amounts of the chemical conversion coating films were too small, so that the composite members of Comparative Examples 1 and 2 provided with the surface-treated steel sheet were poor in adhesive strength.

In Comparative Example 3, the thickness of the adhesive layer was too small, so that the composite member of Comparative Example 3 provided with the surface-treated steel sheet was poor in adhesive strength. In Comparative Example 4, the thickness of the adhesive layer was too large, so that the composite member of Comparative Example 4 provided with the surface-treated steel sheet was poor in adhesive strength.

In Comparative Example 5, the acid value of the acid-modified polypropylene resin in the chemical conversion coating film was extremely small, so that an aqueous chemical conversion coating film-forming coating liquid could not be produced. In Comparative Example 6, when a resin was prepared in which the acid value of the acid-modified polypropylene resin in the chemical conversion coating film was extremely large, an acid-modified olefin resin could not be produced.

In Comparative Example 7, the acid value of the acid-modified polyolefin resin in the adhesive layer was too low, so that the composite member of Comparative Example 7 provided with the surface-treated steel sheet was poor in adhesive strength. In Comparative Example 8, the acid value of the acid-modified polyolefin resin in the adhesive layer was too high, so that the composite member of Comparative Example 8 provided with the surface-treated steel sheet was poor in adhesive strength. This is inferred to be because the adhesive force between the resin layer and the adhesive layer was weak.

The surface-treated steel sheets in Comparative Examples 9 to 10 each have a chemical conversion coating film that does not contain an acid-modified polyolefin resin. Therefore, the composite members of Comparative Examples 9 to 10 provided with the surface-treated steel sheets were poor in adhesive strength.

This application is based on Japanese Patent Application No. 2016-061676 filed on Mar. 25, 2016, the contents of which are incorporated in the present application.

While the present invention has been appropriately and sufficiently explained above by way of embodiments with reference to specific examples and others in order to illustrate the present invention, A person skilled in the art should recognize, however, that the embodiments described above can be easily modified and/or improved. Therefore, it is understood that modified embodiments or improved embodiments that a person skilled in the art can perform are encompassed within the scope as claimed in the appended claims, so long as these modifications and improvements do not depart from the scope of the claims.

INDUSTRIAL APPLICABILITY

The present invention has a wide range of industrial applicability in the technical field related to a surface-treated metal sheet.

The invention claimed is:

1. A surface-treated metal sheet for polyolefin resin bonding, comprising:
   a metal substrate;
   an adhesive layer laminated on at least one surface of the metal substrate; and
   a chemical conversion coating film interposed between the metal substrate and the adhesive layer,
   wherein the chemical conversion coating film is a coating film obtained by applying onto the metal substrate a coating liquid comprising a colloidal silica, a silane coupling agent, and resin;
   wherein the resin of the chemical conversion coating film comprises a first acid-modified polyolefin resin consisting of an acid-modified polypropylene resin,
   wherein a coating amount of the chemical conversion coating film is in a range of from 0.2 to 3 g/m$^2$ in terms of dry mass,
   wherein the adhesive layer comprises a second acid-modified polyolefin resin consisting of an acid-modified polypropylene resin,
   wherein the first acid-modified polyolefin resin in the chemical conversion coating film has an acid value of 5 to 76 mg KOH/g,
   wherein, relative to 100 mass % of total resin in the adhesive layer, a content of the second acid-modified polyolefin resin is 80 mass % or more and 100 mass % or less,
   wherein the second acid-modified polyolefin resin in the adhesive layer has an acid value in a range of from 13 to 49 mg KOH/g, and
   wherein the adhesive layer has a thickness in a range of from 6 to 90 μm.

2. The sheet of claim 1, wherein the first acid-modified polyolefin resin consists of a maleic anhydride grafted polypropylene resin.

3. The sheet of claim 1, wherein, with respect to 100 mass % of the total resin in the adhesive layer, the second acid-modified polyolefin resin is present in the adhesive layer in a range of from 90 to 99.5 mass %.

4. The sheet of claim 1, wherein the second acid-modified polyolefin resin consists of a maleic anhydride grafted polypropylene resin.

5. The sheet of claim 1, wherein the metal substrate is a steel sheet.

6. A composite member, comprising:
   the surface-treated metal sheet of claim 1; and
   a resin layer comprising a polypropylene resin provided on the adhesive layer in the surface-treated metal sheet.

7. The composite member of claim 6, wherein the resin layer further comprises glass fiber.

8. The sheet of claim 7, wherein the glass fibers in the resin layer are present in a range of from 5 to 60 mass %, based on total resin layer mass.

9. A method for producing the surface-treated metal sheet of claim 1, the method comprising:
   forming the chemical conversion coating film by applying onto at least one surface of the metal substrate the chemical conversion coating film-forming coating liquid comprising the first acid-modified polyolefin resin, the colloidal silica, and the silane coupling agent; and
   laminating the adhesive layer onto the chemical conversion coating film by applying a hot-melt adhesive comprising the second acid-modified polyolefin resin onto the chemical conversion coating film.

10. The sheet of claim 1, wherein the chemical conversion coating film comprises no thermoplastic resin other than the first acid-modified polyolefin resin.

11. The sheet of claim 1, wherein the chemical conversion coating further comprises a polystyrene, acrylonitrile-butadiene-styrene, acrylonitrile-EPDM-styrene, acrylic, polybutadiene, polyacetal, polyether, polyvinyl acetate, polyvinyl chloride, and/or polyvinylidene chloride resin.

12. The sheet of claim 1, wherein, relative to 100 mass % total resin in the chemical conversion coating film, the first acid-modified polyolefin resin is 80 mass % or more.

13. The sheet of claim 1, wherein, relative to 100 mass total resin in the chemical conversion coating film, the first acid-modified polyolefin resin is 90 mass % or more.

14. The sheet of claim 1, wherein, relative to 100 mass % total resin in the chemical conversion coating film, the first acid-modified polyolefin resin is 99.91 mass % or more.

15. The sheet of claim 1, wherein, relative to 100 parts by mass of solid content in the coating liquid, the resin of the chemical conversion coating film is present in a range of from 30 to 60 parts by mass.

16. The sheet of claim 1, wherein, relative to 100 parts by mass of solid content in the coating liquid, the resin of the chemical conversion coating film is present in a range of from 35 to 55 parts by mass.

17. The sheet of claim 1, wherein, relative to 100 parts by mass of solid content in the coating liquid, the resin of the chemical conversion coating film is present in a range of from 40 to 60 parts by mass.

18. The sheet of claim 1, wherein, relative to 100 parts by mass of the solid contents of the chemical conversion coating film-forming coating liquid, the resin in the chemical conversion coating film is present in a range of from 40 to 50 parts by mass.

19. The sheet of claim 1, wherein, relative to 100 parts by mass of the solid contents of the chemical conversion coating film-forming coating liquid, the resin in the chemical conversion coating film is present in a range of from 35 to 50 parts by mass.

* * * * *